(12) United States Patent
Löfgren et al.

(10) Patent No.: US 10,858,781 B2
(45) Date of Patent: Dec. 8, 2020

(54) METHOD OF TREATING CELLULOSE PULP

(71) Applicant: SÖDRA SKOGSÄGARNA EKONOMISK FÖRENING, Växjö (SE)

(72) Inventors: Caroline Löfgren, Kullavik (SE); Linda Friman, Kållered (SE); Linda Svedberg, Tvååker (SE)

(73) Assignee: SÖDRA SKOGSÄGARNA EKONOMISK FÖRENING

( * ) Notice: Subject to any disclaimer, the term of this patent is extended or adjusted under 35 U.S.C. 154(b) by 419 days.

(21) Appl. No.: 15/571,181

(22) PCT Filed: Apr. 8, 2016

(86) PCT No.: PCT/EP2016/057736
§ 371 (c)(1),
(2) Date: Nov. 1, 2017

(87) PCT Pub. No.: WO2016/177534
PCT Pub. Date: Nov. 10, 2016

(65) Prior Publication Data
US 2018/0347112 A1  Dec. 6, 2018

(30) Foreign Application Priority Data
May 6, 2015  (SE) .................................... 1550577

(51) Int. Cl.
*D21C 9/04*  (2006.01)
*D21C 9/00*  (2006.01)
(Continued)

(52) U.S. Cl.
CPC .............. *D21C 9/004* (2013.01); *C08B 16/00* (2013.01); *D21C 5/00* (2013.01); *D21H 11/18* (2013.01)

(58) Field of Classification Search
None
See application file for complete search history.

(56) References Cited

U.S. PATENT DOCUMENTS 1,955,092 A   4/1934  Richter
2,289,085 A   7/1942  Halewijn
(Continued)

FOREIGN PATENT DOCUMENTS

GB  194693 A  9/1923
GB  372264 A  5/1932
(Continued)

OTHER PUBLICATIONS

International Search Report for corresponding International Application No. PCT/EP2016/057736, dated Jul. 14, 2016.
(Continued)

*Primary Examiner* — Jacob T Minskey
(74) *Attorney, Agent, or Firm* — Tarolli, Sundheim, Covell & Tummino LLP (57) ABSTRACT

Disclosed is a method of treating cellulose pulp for use in regeneration of cellulose including the steps of: i) preparing an alkaline metal hydroxide solution having a concentration of 4-10% by weight; ii) adding cellulose pulp to form a slurry; iii) heating the slurry to a temperature of 40-100° C.; and iv) dissolving the treated cellulose pulp in an alkaline solution having a temperature within the range of −10° C. to 12° C.; wherein the percentage by weight is based on the total weight of the slurry.

26 Claims, 4 Drawing Sheets

(51) Int. Cl.
*C08B 16/00* (2006.01)
*D21C 5/00* (2006.01)
*D21H 11/18* (2006.01)

(56) References Cited

U.S. PATENT DOCUMENTS

| | | | |
|---|---|---|---|
| 2,811,518 | A | 10/1957 | Mitchell et al. |
| 4,269,973 | A | 5/1981 | Geyer, Jr. et al. |
| 7,108,907 | B1 | 9/2006 | Yamane et al. |
| 2009/0014902 | A1* | 1/2009 | Koivunen .................. C08J 3/05 264/11 |
| 2012/0000621 | A1* | 1/2012 | Stigsson ............. C08B 37/0057 162/158 |

FOREIGN PATENT DOCUMENTS

| | | | |
|---|---|---|---|
| GB | 472934 A | 9/1937 | |
| GB | 552681 A | 4/1943 | |
| WO | WO-0196402 A1 * | 12/2001 | ............. C08B 1/003 |
| WO | 2010104458 A1 | 9/2010 | |

| | | | |
|---|---|---|---|
| WO | 2013124265 A1 | 8/2013 | |

OTHER PUBLICATIONS

Swedish Office Action for Application No. 1550577-9 dated Nov. 13, 2015.
International Preliminary Report on Patentability for Application Number PCT/EP2016/057736 dated May 6, 2016.
Budtova, et al. "Cellulose in NaOH-water based solvents" published in Cellulose, on Feb. 2016, vol. 23, Issue 1, pp. 5-55.
European Observation for Application No. 3 292 244 dated May 20, 2019.
Kvarnlof, et al. "Pressurized oxygen treatment of alkali cellulose prior to the preparation of viscose dope" published in Paper and Timber, vol. 89, No. 7-8, 2007, pp. 431-432.
European Office Action for Application No. 16 716 023.3-1102 dated Jun. 6, 2019.
Kvarnlof, N, et al. "The effect of modifying the oxidative pre-aging conditions in the manufacture of viscose from wood pulp" 2006, Paperi ja Puu, vol. 88, No. 3, pp. 175-180 Abstract Only.

* cited by examiner

METHOD OF TREATING CELLULOSE PULP

RELATED APPLICATIONS

The present invention is a U.S. National Stage under 35 USC 371 patent application, claiming priority to Serial No. PCT/EP2016/057736, filed on 8 Apr. 2016; which claims priority of Swedish Application No. 1550577-9, filed on 6 May 2015, the entirety of both of which are incorporated herein by reference.

FIELD OF THE INVENTION

The present invention relates to a method of treating cellulose pulp for use in regeneration of cellulose.

BACKGROUND

Cellulose is an important constituent in plants and comprises anhydrous glucose units. Dissolution of cellulose plays an important role in the production of cellulose derivates and blended material. Cellulose is used for producing man-made fibers for instance by spinning a yarn, thread, or fibers etc.

Dissolution of natural cellulosic fibers takes place in two steps; first the solvent penetrates into the fiber structure and then separates the polymer chains from each other. Dissolution mechanism depends on fiber type and mostly on the solvent system.

There are several known ways to dissolve cellulose for various applications including manufacture of regenerated cellulosic fibers. However, often expensive, toxic or non-environmental friendly chemicals are used in such processes.

A well known method for regeneration of cellulose is the viscose process. The viscose process is carried out in alkaline medium, and it typically starts with mercerization in concentrated sodium hydroxide (18% w/v) to make the cellulose accessible for carbon disulphide ($CS_2$) during the thereafter following xantification step in which sodium cellulose xanthate (cellulose-O—$S_2^-Na^+$) is formed. Within the viscose process, the xantification is crucial to dissolve the cellulose into a well functioning spinning dope. Without this xantification step, the cellulose will not dissolve properly, and accordingly no or at least very low yield values would result in a viscose process without the xantification step. Further, the viscose process, aside from regenerated cellulose, also releases dithiocarbonic acid, which later decomposes to carbon disulfide and water. Accordingly, the viscose production method has high environmental costs. Examples of publications concerning the viscose process are U.S. Pat. Nos. 4,269,973, 1,955,092, and Kvarnlöf et al: "The effect of modifying the oxidative pre-aging conditions in the manufacture of viscose from wood pulp"; Paper and Timber, Vol. 88, No. 3, 2006.

In JP2008222859 a production method of sodium carboxy methyl cellulose having high yield values is disclosed. The production method is performed in a water-containing organic solvent containing 5-8% by weight sodium hydroxide at 45-55° C. for 120-180 min, and the water-containing organic solvent preferably being isopropanol. Thereafter an etherification reaction is performed at 60-70° C. for 100-150 min to obtain a water-soluble cellulose.

Thus, many of the prior art methods for manufacture of regenerated cellulosic fibers involve some sort of derivatisation of the cellulose, e.g. the viscose process and also the method of JP2008222859, in order to be able to dissolve the cellulose into a spinning dope which provides proper yield values.

Sodium hydroxide solutions with or without additives has got more attention as a water-based, cheap and environmentally friendly solvent, and cold alkali treatment of cellulose pulp (about −5° C., and 7-10% by weight of NaOH) has gained more and more attention as an environmental friendly method for dissolving cellulose into a spinning dope. It has been shown, however, that cellulose molecules are not completely dissolved in cold sodium hydroxide solutions but form aggregates. Also dependence of solubility on the degree of polymerization (DP) has been studied in NaOH-urea-water systems and concluded that only low DP cellulose can be dissolved. This means that native cellulose has to be pretreated in order to reduce the polymer chain length.

Acid hydrolysis has been applied as a pretreatment to make cellulose molecules shorter and more accessible for chemicals or complete hydrolysis to produce glucose. Traditionally hydrolysis has been carried out at high temperature and low acid concentration or vice verse. Another suggested pretreatment of cellulose was ethanol-acid pretreatment of pulp. However, when continuing the dissolution in e.g. alkaline solution, this type of pretreatment step require substantive washing of the pulp and neutralization in order to switch over to the alkaline solution, and this will add to the cost of the process.

Thus, there is a need for an improved process for pretreatment of cellulose, in particular when using cellulose pulp, such as dissolving pulp.

SUMMARY

An object of the invention is to provide an improved method of treating cellulose pulp for use in regeneration of cellulose, which is more environmental friendly, and more cost effective.

According to a first aspect, this and other objects are achieved, in full or at least in part, by a method of treating cellulose pulp for use in regeneration of cellulose. According to the invention the method comprises the steps of: i) preparing an alkaline metal hydroxide solution having a concentration of 4-10% by weight; ii) adding cellulose pulp to form a slurry; iii) heating said slurry to a temperature of 40-100° C.; and iv) dissolving the treated cellulose pulp in an alkaline solution having a temperature within the range of −10° C. to 12° C.; wherein the percentage by weight is based on the total weight of said slurry.

The advantages according to the invention is that substantive washing steps and neutralization steps may be eliminated as there is no change from acid to alkaline process, like with the ethanol-acid pretreatment continuing with alkaline dissolution and regeneration process. Further, during neutralization added chemicals are consumed, which increases the total amount of chemicals for the process. Even further, with the claimed method no derivatization of the cellulose is required to dissolve the cellulose, like in the viscose process or in the method according to JP2008222859 mentioned above. Thus, the process according to the invention is more environmental friendly, more straight forward, and more cost effective.

According to an embodiment, the slurry has a cellulose content of 3-40% by weight, based on the total weight of said slurry.

According to another embodiment, the cellulose content in the alkaline solution of step iv) is at least 4% by weight based on the total weight of said slurry.

According to one embodiment, the method of treating cellulose pulp for use in regeneration of cellulose is made without any method steps involving derivatisation of the cellulose. Thus, no xantification step, esterification step, etherification, or carbamate derivate step is made.

According to another embodiment, the cellulose pulp is a dissolving pulp. Dissolving pulp is a wood pulp or a cotton linters that has a high cellulose content (>90%). This pulp is manufactured for uses that require a high chemical purity, and particularly low hemicellulose content, since the chemically similar hemicellulose can interfere with subsequent processes.

According to yet another embodiment, the alkaline metal hydroxide solution is prepared to a concentration of 5-8% by weight and preferably to a concentration of 6% by weight, based on the total weight of said slurry.

In one embodiment, the alkaline metal hydroxide is NaOH.

According to another embodiment, the cellulose slurry, in step iii) is heated for a time period of 0.5-24 hours, preferably 2-10 hours, and more preferably 2-8 hours.

According to yet another embodiment, the method comprises the steps of: i) preparing an alkaline metal hydroxide solution having a concentration of 4-10% by weight; ii-a) adding cellulose pulp to form a slurry having a cellulose content of 3-10% by weight; iii-a) heating said slurry from step ii-a) to a temperature of 40-100° C. for a first time period; ii-b) increasing the cellulose content in the slurry to a cellulose content of 10-40% by weight, preferably by dewatering; iii-b) heating said slurry from step ii-b) to a temperature of 40-100° C. for a second time period; and iv) dissolving the treated cellulose pulp in an alkaline solution having a temperature within the range of −10° C. to 12° C.; wherein the percentages by weight are based on the total weight of said slurry.

One advantage with this embodiment is that the steps ii-a) and iii-a) provides an improved impregnation of each fiber with the alkaline solution, which reduces the acquired process time for step iii-b). Further, the alkaline solution will be more evenly distributed within the cellulose pulp.

In yet another embodiment said first time period is 5-30 minutes, preferably about 10-15 minutes.

In yet another embodiment, said second time period is 0.5-24 hours, preferably 2-10 hours, and more preferably 2-8 hours.

In one embodiment an accelerator is added during the treatment. Said accelerator may comprise at least one of manganese salt, cobalt salt, ferrous(II) salt, ferric (III) salt, and copper(II) salt, and said at least one accelerator may preferably be added to the cellulose pulp before adding the cellulose pulp to the prepared alkaline metal hydroxide solution to form said slurry. Said accelerator may also comprise at least one of oxygen, and peroxides, and said at least one accelerator may preferably be added to the slurry in step iii) or in step iii-b).

In a further embodiment, said slurry in step iii) or step iii-b) further may be subjected to an overpressure, preferably within the range of 5-15 bar.

In yet another embodiment, said cellulose slurry may, in step iii-a), have a cellulose content of 4-8% by weight, preferably 5-6% by weight, based on the total weight of said slurry, whereas said cellulose slurry in step iii) or in step iii-b) may have a cellulose content of 15-35% by weight, preferably 20-35% by weight, more preferably 25-35% by weight, based on the total weight of said slurry.

In one embodiment, said slurry, in at least one of step iii), iii-a) and iii-b), may be heated to a temperature within the range of 50-90° C., and preferably within the range of 60-80° C.

After completion of step iii) or after completion of step iii-b), said slurry may be subjected to washing and thereafter drying. This is advantageous if the slurry is to be shipped to another operation plant for dissolution (step iv)) and further regeneration processes or if the treated cellulose pulp is to rest for some time before being further processed.

According to a second aspect of the invention, the objects disclosed above, are also achieved, in full or at least in part, by a cellulose pulp treated according to the method according to anyone of the above-disclosed embodiments.

According to one embodiment of said second aspect, said cellulose pulp has, after step iii) or step iii-b), a viscosity of up to 350 dm$^3$/kg, preferably up to 300 dm$^3$/kg, and even more preferred up to 250 dm$^3$/kg. According to one embodiment of said second aspect, said cellulose pulp has a viscosity of at least 200 dm$^3$/kg.

According to a further embodiment, the cellulose pulp is subjected to swelling between step iii) or iii-b) and step iv). This may be performed by incubating the treated cellulose pulp in an alkaline solution at low temperature. In one embodiment said swelling is performed by preparing an alkaline solution comprising 4-10% by weight of sodium hydroxide, and adding the cellulose pulp, treated according to step iii) or iii-b), to a content of 4-10% by weight. The swelling may be performed at >0° C. over night.

Again, the slurry may after completion of step iii) or after completion of step iii-b), be subjected to washing and thereafter drying. This is advantageous if the slurry is to be shipped to another operation plant for swelling and dissolution (step iv)) and further regeneration processes or if the treated cellulose pulp is to rest for some time before being further processed.

According to an additional embodiment, at least one additive is added. According to one embodiment said additive may be at least one of zinc ions, aluminum ions, urea, polyethylene oxide adducts, surfactants, and so forth. Said at least one additive may be added for said swelling and/or in said step (iv).

Other objectives, features and advantages of the present invention will appear from the following detailed disclosure, from the attached claims, as well as from the drawings. It is noted that the invention relates to all possible combinations of features.

Generally, all terms used in the claims are to be interpreted according to their ordinary meaning in the technical field, unless explicitly defined otherwise herein. All references to "a/an/the [element, device, component, means, step, etc.]" are to be interpreted openly as referring to at least one instance of said element, device, component, means, step, etc., unless explicitly stated otherwise. The steps of any method disclosed herein do not have to be performed in the exact order disclosed, unless explicitly stated.

As used herein, the term "comprising" and variations of that term are not intended to exclude other additives, components, integers or steps.

DETAILED DESCRIPTION

The present invention will now be described more fully hereinafter with reference to the accompanying drawings.

The present invention may, however, be embodied in many different forms and should not be construed as limited to the embodiments set forth herein; rather, these embodiments are provided for thoroughness and completeness, and to fully convey the scope of the invention to the skilled addressee.

When using a dissolving process with cold alkaline solution having a temperature within the range of −10° C. to 12° C. (step (iv)), some sort of treatment is necessary in order to lower the viscosity of the cellulose pulp.

Commercial dissolving pulp normally has a viscosity within the range of about 400 to 1200 $dm^3$/kg. In order to be soluble within the cold alkaline solution process, a viscosity within the range of 200 to 250 $dm^3$/kg is preferred to provide an effective dissolving. However, a viscosity of up to about 350 $dm^3$/kg is also a possible option.

However, when treating the cellulose pulp with an alkaline solution there might be a potential risk that the metastable cellulose I is transformed into the stable cellulose II, and this transfer from cellulose I to cellulose II is irreversible. Thus, the treatment has to be balanced in order to lower the viscosity of the cellulose pulp, but not create a transformation from cellulose I into cellulose II.

In the below given examples the treated cellulose pulp is tested for further use in a dissolving process with cold alkaline solution.

EXAMPLE 1

Sodium hydroxide solutions, with the below in Table 1 indicated concentrations were prepared. Cellulose pulp was added to form a slurry with a cellulose content of about 5% by weight. The slurry was heated to 50° C. for 10 minutes, and thereafter the cellulose content was increased by wash pressing the slurry to a cellulose content of about 30-40% by weight.

Thereafter, the slurry was heated to 50° C. The heating was stopped at varying times for different samples of the treated cellulose pulp, and the cellulose pulp was cooled to stop further lowering of the viscosity thereof. The viscosity was measured for each sample.

The treated cellulose pulp was allowed to swell over night in a 6% by weight NaOH solution and a cellulose content of 5% by weight at a temperature of >0° C.

Thereafter the treated cellulose pulp was dissolved in 8% by weight sodium hydroxide (NaOH), and 0.8% zinc oxide (ZnO). The cellulose content was about 5% by weight. The slurry of cellulose pulp was continuously stirred at a temperature of about −8° C. for at least 10 minutes.

Dissolution was detected by light microscopy both with and without polarized light.

TABLE 1

| ID | NaOH (% by weight) | Viscosity after pretreatment ($dm^3$/kg) | Treatment time (min) | Dissolution |
|---|---|---|---|---|
| 1 | 26 | 227 | 180 | No dissolution was found, a lot of fibers shown in microscopic review |
| 2 | 18 | 239 | 270 | No proper dissolution was found, still a lot of fibers shown in microscopic review. |
| 3 | 10 | 252 | 960 | Dissolution was found, however some fibers remained non-dissolved. |

The treatments with 26% by weight and 18% by weight NaOH, respectively, resulted in no detectable dissolving of cellulose, which probably is due to the transformation of native cellulose I into the less dissolvable cellulose II.

The treatment with 10% by weight worked, even though showing some fibers remaining after dissolving, but the treatment step as such required an undesirable long process time in order to reach the targeted viscosity range. Thus, the process efficiency may be improved further.

EXAMPLE 2

In order to avoid the transformation of cellulose I into cellulose II, additional test was performed with lower concentrations of sodium hydroxide. However, as the process efficiency seems to decrease with decreased sodium hydroxide, an accelerator was provided to the treatment step.

Sodium hydroxide solutions, with the below in Table 2 indicated concentrations was prepared. Cellulose pulp was added to form a slurry with a cellulose content of about 5% by weight. The slurry was heated to 50° C. for 10 minutes, and thereafter the cellulose content was increased by wash pressing the slurry to a cellulose content of about 30-40% by weight.

Thereafter, the slurry was heated to 50° C. The heating was stopped at varying times for different samples of the treated cellulose pulp, and the cellulose pulp was cooled to stop further lowering of the viscosity thereof. The viscosity was measured for each sample.

Accelerators were used in this example, pressurized $O_2$, 5 bar or 15 bar, respectively, or a manganese salt, in form of $MnSO_4$, in a concentration of 25 ppm or 100 ppm, respectively.

When using pressurized $O_2$ as accelerator, the treatment was made in an autoclave chamber, and the chamber was first evacuated to vacuum, and thereafter $O_2$ was added to an overpressure of 5 bar $O_2$ or 15 bar $O_2$.

When using manganese salt, the salt was added by applying a solution of the manganese salt to the cellulose pulp. This may be accomplished by spraying and/or mixing the solution onto/into the cellulose pulp.

The treated cellulose pulp was allowed to swell over night in a 6% by weight NaOH solution and a cellulose content of 5% by weight at a temperature of >0° C.

Thereafter the treated cellulose pulp was dissolved in 8% by weight sodium hydroxide (NaOH), and 0.8% zinc oxide (ZnO). The cellulose content was about 5% by weight. The slurry of cellulose pulp was continuously stirred at a temperature of about −8° C. for at least 10 minutes.

Dissolution was detected by polarized light both with and without polarized light.

TABLE 2

| ID | NaOH (% by weight) | Accelerator | Viscosity after pretreatment ($dm^3/kg$) | Treatment time (min) | Dissolution |
|---|---|---|---|---|---|
| 4 | 10 | 5 bar $O_2$ | 219 | 360 | Dissolution was found; some fibers remained undissolved. |
| 5 | 8 | 15 bar $O_2$ | 207 | 600 | Dissolution was found; however some fibers remained undissolved, but less than in with 10% by weight of NaOH. |
| 6 | 7 | 15 bar $O_2$ | 230 | 840 | Dissolution was found; however some fibers remained undissolved, but less than in with 8% by weight of NaOH. |
| 8 | 6 | 100 ppm $Mn^{2+}$ | 234 | 960 | Proper dissolving was found. |

The treatments with 10% by weight NaOH, 8% by weight NaOH, and 7% be weight NaOH worked, even though showing some fibers remained after dissolving.

The treatments with 6% by weight NaOH provided proper dissolving, but again the treatment step as such required an undesirable long process time in order to reach the targeted viscosity range, even though using accelerators. Thus, the process efficiency may be improved further.

EXAMPLE 3

In order to improve the efficiency of the treatment even further, the temperature was increased during the treatment.

Thus, sodium hydroxide solutions having a concentration of 6% by weight were prepared. Cellulose pulp was added to form slurries with a cellulose content of about 5% by weight. The slurries were heated to 60° C. for 10 minutes, and thereafter the cellulose content was increased by wash pressing the slurries to a cellulose content of about 30-40% by weight.

Thereafter, the slurries were heated to 60° C. The heating was stopped at varying times for different samples of the treated cellulose pulp, and the cellulose pulp was cooled to stop further lowering of the viscosity thereof. The viscosity was measured for each sample.

The accelerators used in this example were pressurized $O_2$ at 15 bar, and a manganese salt, in form of $MnSO_4$, in a concentration of 100 ppm, or a combination thereof.

The treated cellulose pulp was allowed to swell over night in a 6% by weight NaOH solution and a cellulose content of 5% by weight at a temperature of >0° C.

Thereafter the treated cellulose pulp was dissolved in 8% by weight sodium hydroxide (NaOH), and 0.8% zinc oxide (ZnO). The cellulose content was about 5% by weight. The slurry of cellulose pulp was continuously stirred at a temperature of about −8° C. for at least 10 minutes.

Dissolution was detected by polarized light both with and without polarized light.

TABLE 3

| ID | NaOH (% by weight) | Accelerator | Viscosity after pretreatment ($dm^3/kg$) | Treatment time (min) | Dissolution |
|---|---|---|---|---|---|
| 11 | 6 | 15 bar $O_2$ | 230 | 480 | Proper dissolving was found. |
| 12 | 6 | 100 ppm $Mn^{2+}$ | 241 | 480 | Proper dissolving was found. |
| 13 | 6 | 15 bar $O_2$ and 100 ppm $Mn^{2+}$ | 254 | 480 | Proper dissolving was found. |

The treatments with 6% by weight NaOH, provided proper dissolving, and the targeted viscosity range was reached within a reasonable process time of about 5-8 hours treatment.

EXAMPLE 4

Two different cellulose dopes (A) and (B), prepared according to below, were both spun in two different ways (carbonate based coagulation and sulphuric acid based coagulation) and the properties of the produced fibers were tested.

Cellulose dope (A) was produced by preparing a sodium hydroxide solution having a concentration of 6% by weight were prepared. Cellulose pulp was added to form a slurry with a cellulose content of about 5% by weight. The slurry was heated to 60° C. for 10 minutes, and thereafter the cellulose content was increased by wash pressing the slurry to a cellulose content of about 30-40% by weight.

Thereafter, the slurry was pressurised to 15 bar with $O_2$, and was heated to 60° C. for 9 hours. The measured viscosity for the treated cellulose pulp was 213 $dm^3/kg$. The treated cellulose pulp was allowed to swell over night in a 6% by weight NaOH solution and a cellulose content of 5% by weight at a temperature of >0° C.

Cellulose dope (B) was produced by preparing a sodium hydroxide solution having a concentration of 6% by weight were prepared. Cellulose pulp was added to form a slurry with a cellulose content of about 5% by weight. The slurry was heated to 60° C. for 10 minutes, and thereafter the cellulose content was increased by dewatering the slurry to a cellulose content of about 30-40% by weight.

Thereafter, the slurry was pressurised to 15 bar with $O_2$, and was heated to 60° C. for 8 hours. The measured viscosity for the treated cellulose pulp was 238 dm³/kg. The treated cellulose pulp was allowed to swell over night in a 6% by weight NaOH solution and a cellulose content of 5% by weight at a temperature of >0° C.

The swollen treated cellulose pulps ((A) and (B)) were thereafter dissolved in 8% by weight sodium hydroxide (NaOH), and 0.8% zinc oxide (ZnO). The cellulose content was about 5% by weight. The slurry of cellulose pulp was continuously stirred at a temperature of about −8° C. for at least 10 minutes.

Thereafter one part of the cellulose dope (A) and one part of the cellulose dope (B) was each coagulated in a carbonate based coagulation solution comprising 24% by weight $Na_2CO_3$ and 4% by weight NaOH at 30° C., and another part of the cellulose dope (A) and another part of the cellulose dope (B) was each coagulated in a sulphuric acid based coagulation solution comprising 15% by weight $Na_2SO_4$ and 10% by weight of $H_2SO_4$ at room temperature. The cellulose dope was added in a flow speed of 4.2 ml/min, which corresponds to 8.3 m/min of non-stretched fiber.

After spinning, the fibers were transferred to a stretch solution comprising water with a temperature of about 75° C. The fibres from the carbonate based coagulation as well as fibres from the sulphuric acid based coagulation were stretched from 0 to 100%. After stretching, the fibres were washed, and thereafter allowed to rest in deionised water for one day. The fibres were dried at 105° C. for 1 hour and thereafter allowed to acclimate in a climate chamber before tensile tests.

The tensile tests were performed with a Vibroskop/Vibrodyn (Lenzing Instruments). The measurements were performed with the fibre length of 20 mm, test speed 20 mm/min and damper weight 100 mg. 10 measurements were performed on each sample. From the tensile tests, tensile strength (cN/tex), elongation (%), and titre was obtained. Titre is a measure of linear density and is measured in tex, wherein 1 tex equals 1 mg/m.

Figure 1:
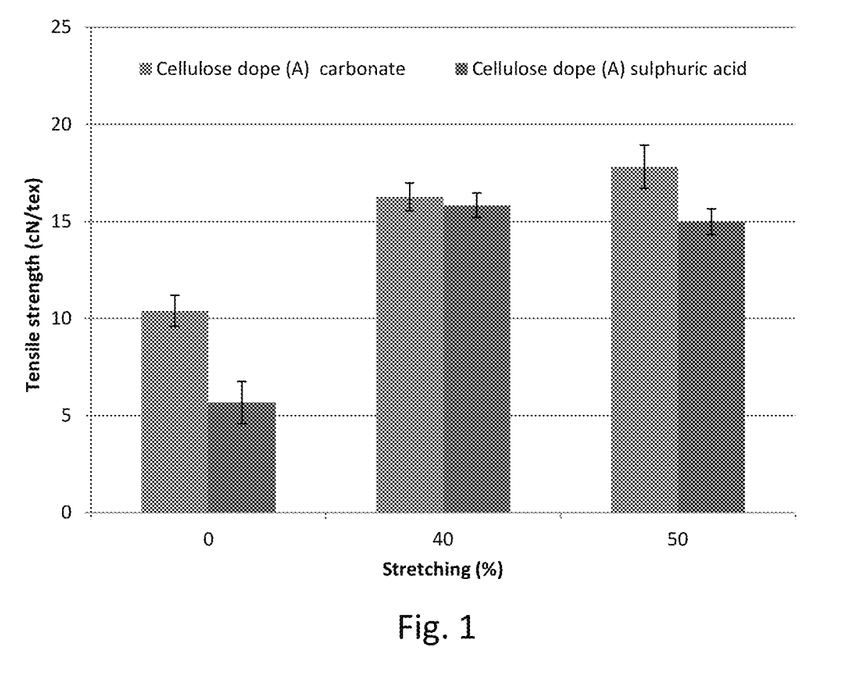
FIG. 1 shows the tensile strength for fibres from cellulose dope (A) being stretched 0%, 40% and 50%, left staple representing fibres spun in the carbonate based coagulation solution, and right staple representing fibres spun in the sulphuric acid based coagulation solution.

FIG. 1 shows the tensile strength for fibres from cellulose dope (A) being stretched 0%, 40% and 50%, left staple representing fibres spun in the carbonate based coagulation solution, and right staple representing fibres spun in the sulphuric acid based coagulation solution.

Figure 2:
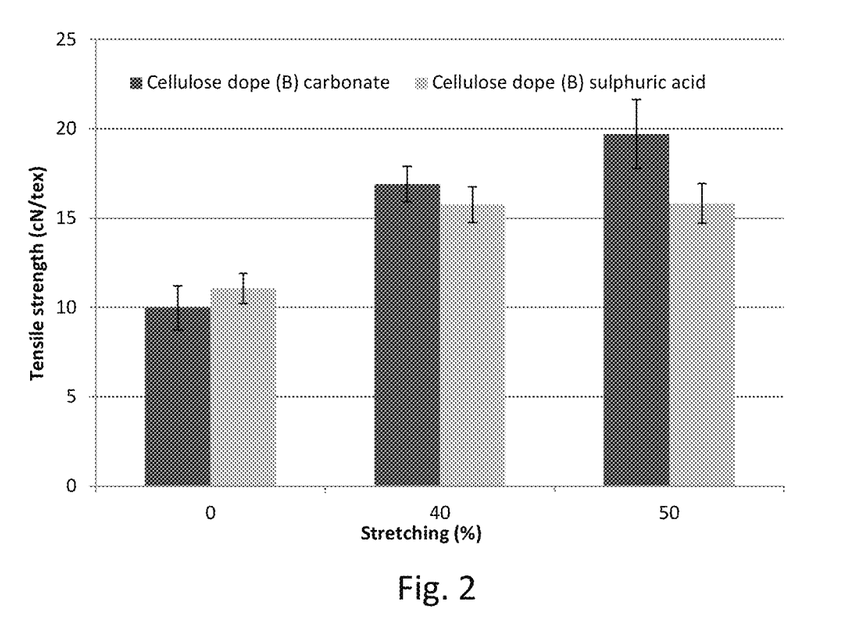
FIG. 2 shows the tensile strength for fibres from cellulose dope (B) being stretched 0%, 40% and 50%, left staple representing fibres spun in the carbonate based coagulation solution, and right staple representing fibres spun in the sulphuric acid based coagulation solution.

FIG. 2 shows the tensile strength for fibres from cellulose dope (B) being stretched 0%, 40% and 50%, left staple representing fibres spun in the carbonate based coagulation solution, and right staple representing fibres spun in the sulphuric acid based coagulation solution.

Figure 3:
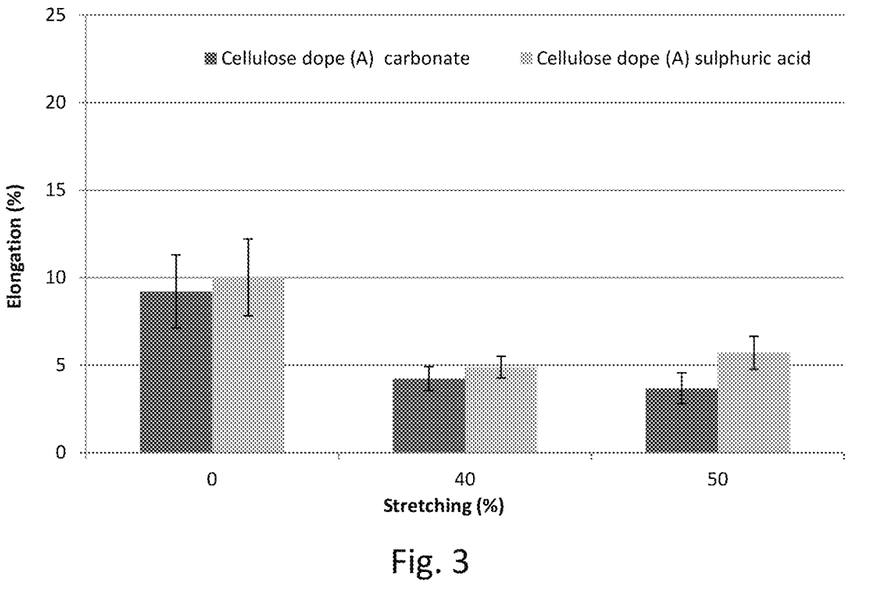
FIG. 3 shows the elongation (%) for fibres from cellulose dope (A) being stretched 0%, 40% and 50%, left staple representing fibres spun in the carbonate based coagulation solution, and right staple representing fibres spun in the sulphuric acid based coagulation solution.

FIG. 3 shows the elongation (%) for fibres from cellulose dope (A) being stretched 0%, 40% and 50%, left staple representing fibres spun in the carbonate based coagulation solution, and right staple representing fibres spun in the sulphuric acid based coagulation solution.

Figure 4:
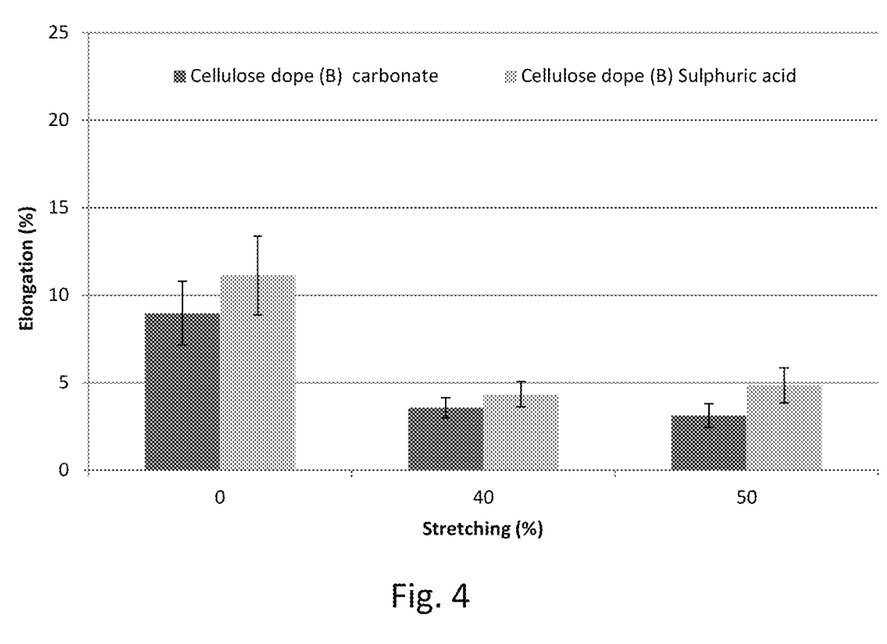
FIG. 4 shows the elongation (%) for fibres from cellulose dope (B) being stretched 0%, 40% and 50%, left staple representing fibres spun in the carbonate based coagulation solution, and right staple representing fibres spun in the sulphuric acid based coagulation solution.

FIG. 4 shows the elongation (%) for fibres from cellulose dope (B) being stretched 0%, 40% and 50%, left staple representing fibres spun in the carbonate based coagulation solution, and right staple representing fibres spun in the sulphuric acid based coagulation solution.

As seen from FIGS. 1-4, the carbonate based coagulation solution provided a somewhat higher tensile strength for fibres from cellulose dope (A) as well as from cellulose dope (B), than the sulphuric acid based coagulation solution. However, elongation was higher with the sulphuric acid based coagulation solution than with the carbonate based coagulation solution.

Figure 5:
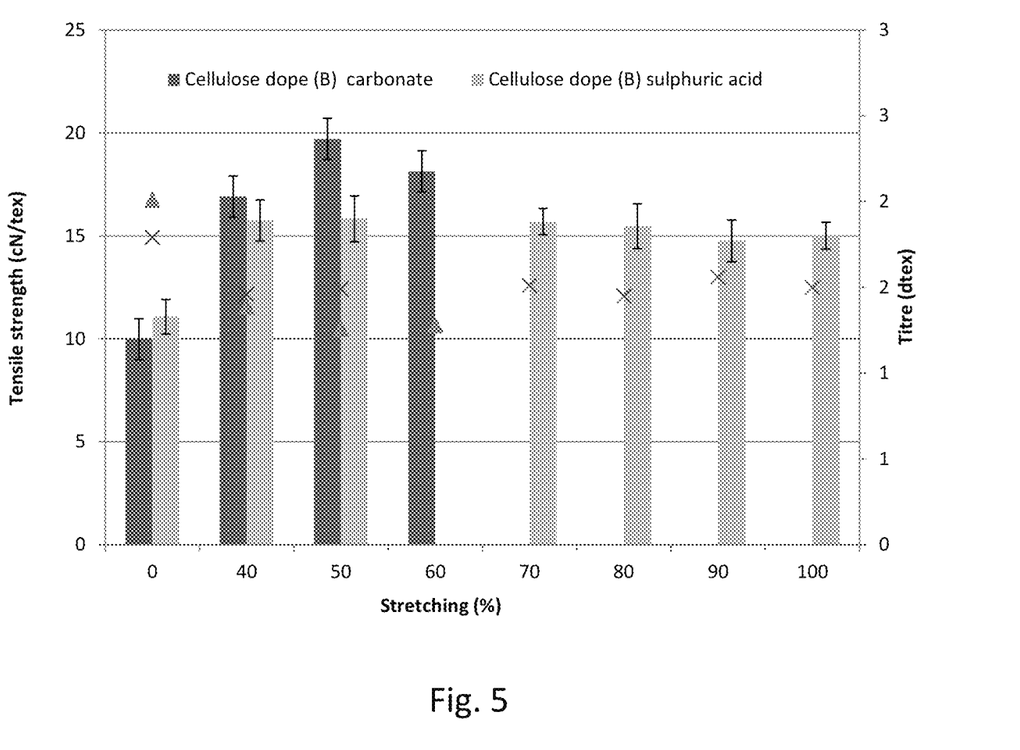
FIG. 5 shows the tensile strength (cN/tex) and titre (dtex) for all fibres from the tensile test of fibres from the cellulose dope (B). The staples represent the tensile strength, the triangular dots represent the carbonate titre, and the crosses represent the sulphuric acid titre.

FIG. 5 shows the tensile strength (cN/tex) and titre (dtex) for all fibres from the tensile test of fibres from the cellulose dope (B). The staples represent the tensile strength, the triangular dots represent the carbonate titre, and the crosses represent the sulphuric acid titre. With the cellulose dope (B), the fibres spun from the carbonate based coagulation solution was possible to elongate to about 60%, thereafter the fibres ruptured. However, the fibres spun from the sulphuric acid based coagulation solution, was possible to elongate to about 100%, when some fibres starter to rupture. However, maximum tensile strength was reached with an elongation of about 50%.

EXAMPLE 5

A comparison between a cellulose pulp prepared according to prior art (HCl treatment; a treatment at 90° C., pH 1, a cellulose pulp content of 5% by weight, and 72.9 kg HCl/tonnage cellulose pulp) having a viscosity of 210 dm³/kg, and the cellulose pulp prepared with 8% by weight of NaOH (ID 5 above) and 7% by weight of NaOH (ID 6 above) was performed in order to study the molecular weight distribution for the different cellulose pulp solutions. Size-exclusion chromatography analysis was used for this comparison.

Figure 6:
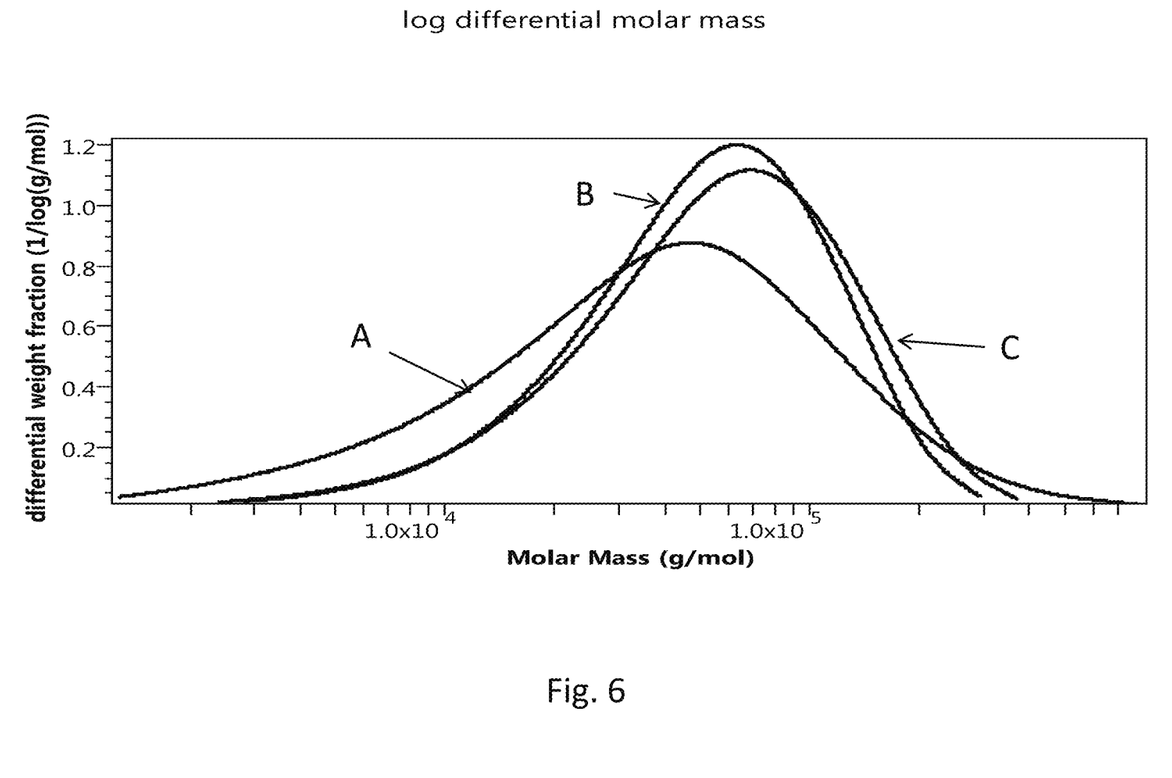
FIG. 6 shows the molecular weight distributions for the three different treated cellulose pulps. The line marked with A shows the molecular weight distribution for the cellulose pulp treated with HCl, the line marked with B shows the molecular weight distribution for the cellulose pulp treated with 8% by weight of NaOH, and the line marked with C shows the molecular weight distribution for the cellulose pulp treated with 7% by weight of NaOH.

FIG. 6 shows the molecular weight distributions for the three different treated cellulose pulps. The line marked with A shows the molecular weight distribution for the cellulose pulp treated with HCl, the line marked with B shows the molecular weight distribution for the cellulose pulp treated with 8% by weight of NaOH, and the line marked with C shows the molecular weight distribution for the cellulose pulp treated with 7% by weight of NaOH. As is evident from FIG. 6, the molecular weight distribution for the two cellulose pulps treated with NaOH provide for a narrower molecular weight distribution than the cellulose pulp treated with HCl.

In table 4 below the molecular weight and polydispersity index for the three different treated cellulose pulps are given. Polydispersity index is a measure of the molecular weight distribution, the lower value, the narrower molecular weight distribution.

TABLE 4

| Treated Cellulose pulp | $M_w$ (kDa) | Polydispersity Index $M_w/M_n$ |
| --- | --- | --- |
| 7% by weight NaOH | 73.6 | 2.1 |
| 8% by weight NaOH | 66.0 | 1.9 |
| HCl | 66.9 | 3.6 |

When the treated cellulose pulp has a narrower molecular weight distribution the fiber properties is influences positively, e.g. by enabling spinning from a cellulose dope with less cellulose content.

The skilled person realises that a number of modifications of the embodiments described herein are possible without departing from the scope of the invention, which is defined in the appended claims.

The invention claimed is:

1. A method of treating cellulose pulp for use in regeneration of cellulose, characterized in that
   said method comprises the steps of:
   i) preparing an alkaline metal hydroxide solution having a concentration of 4-10% by weight;
   ii) adding cellulose pulp to form a slurry;
   iii) heating said slurry to a temperature of 40-100° C.; and iv) dissolving the treated cellulose pulp in an alkaline solution having a temperature within the range of −10° C. to 12° C.;

wherein the percentage by weight is based on the total weight of said slurry.

2. The method according to claim 1, wherein said slurry has a cellulose content of 3-40% by weight, based on the total weight of said slurry.

3. The method according to claim 1, wherein the cellulose content in the alkaline solution of step iv) is at least 4% by weight, based on the total weight of said slurry.

4. The method according to claim 1, wherein the cellulose pulp is a dissolving pulp.

5. The method according to claim 1, wherein the alkaline metal hydroxide solution is prepared to a concentration of 5-8% by weight, based on the total weight of said slurry.

6. The method according to claim 1, wherein the alkaline metal hydroxide is NaOH.

7. The method according to claim 1, wherein the cellulose slurry, in step iii) is heated for a time period of 0.5-24 hours.

8. The method according to claim 1, wherein said method comprises the steps of:
i) preparing an alkaline metal hydroxide solution having a concentration of 4-10% by weight;
ii-a) adding cellulose pulp to form a slurry having a cellulose content of 3-10% by weight;
iii-a) heating said slurry from step ii-a) to a temperature of 40-100° C. for a first time period;
ii-b) increasing the cellulose content in the slurry to a cellulose content of 10-40% by weight;
iii-b) heating said slurry from step ii-b) to a temperature of 40-100° C. for a second time period; and
iv) dissolving the treated cellulose pulp in an alkaline solution having a temperature within the range of −10° C. to 12° C.;

wherein the percentages by weight are based on the total weight of said slurry.

9. The method according to claim 8, wherein said first time period is 5-30 minutes.

10. The method according to claim 8, wherein said second time period is 0.5-24 hours.

11. The method according to claim 1, wherein an accelerator is added during the treatment.

12. The method according to claim 11, wherein said accelerator comprises at least one of manganese salt, cobalt salt, ferrous(II) salt, ferric (III) salt, and copper(II) salt, and wherein said at least one accelerator is added to the cellulose pulp before adding the cellulose pulp to the prepared alkaline metal hydroxide solution to form the slurry.

13. The method according to claim 11, wherein said accelerator comprises at least one of oxygen, and peroxides, and wherein said at least one accelerator is added to the slurry in step iii).

14. The method according to claim 1, wherein said slurry in step iii) or further is subjected to an overpressure within the range of 5-15 bar.

15. The method according to claim 8, wherein said cellulose slurry in step iii-a) has a cellulose content of 4-8% by weight, based on the total weight of said slurry.

16. The method according to claim 1, wherein said cellulose slurry in step iii) has a cellulose content of 15-35% by weight, based on the total weight of said slurry.

17. The method according to claim 1, wherein said slurry, in step iii) is heated to a temperature within the range of 50-90° C.

18. The method according to claim 1, wherein treated cellulose pulp, between step iii) and step iv), is subjected to swelling.

19. The method according to claim 18, wherein the swelling is performed by incubating the treated cellulose pulp in an alkaline solution at a reduced temperature of >0° C.

20. The method according to claim 1, wherein said slurry, after completion of step iii), is subjected to washing and thereafter drying.

21. A cellulose pulp treated according to the method according to claim 1.

22. The method according to claim 1, wherein the cellulose slurry, in step iii) is heated for a time period of 2-10 hours.

23. The method according to claim 8, wherein said first time period is 10-15 minutes.

24. The method according to claim 8, wherein said second time period is 2-10 hours.

25. The method according to claim 8, wherein said cellulose slurry in step iii-b) has a cellulose content of 15-35% by weight, based on the total weight of said slurry.

26. The method according to claim 8, wherein said slurry, in step iii-a) and iii-b), is heated to a temperature within the range of 50-90° C.

* * * * *